3,050,577
METHOD OF CONTROL
James E. Harris, Eaton, and William D. Carson, Muncie, Ind., assignors to General Motors Corporation, Detroit, Mich., a corporation of Delaware
No Drawing. Filed June 29, 1960, Ser. No. 39,714
3 Claims. (Cl. 136—27)

This invention relates to a method of control and is particularly concerned with a method for controlling the metallic lead content in Barton litharge.

It is, therefore, the main object of the invention to provide a simple and effective method for controlling the metallic lead content of Barton litharge during the manufacture thereof from metallic lead.

A still further object of the invention is to control the metallic lead content of Barton litharge through the use of controlled quantities of antimony in the metallic lead which is being oxidized.

Specifically it is another object of the invention to add antimony to lead for use in the Barton pot wherein the antimony ranges from .0015 to .0040% by weight of the lead with about .0025% being preferred.

Further objects and advantages of the present invention will be apparent from the description which follows wherein preferred embodiments of the invention are clearly shown.

Lead oxide used in the manufacture of active material for lead-acid storage battery plates is frequently termed "Barton litharge" since it is made by the "Barton pot process," long identified with the production of oxides of lead.

In this process, lead is melted in a closed pot termed a Barton mill. A flat iron blade skimming over the surface of the molten lead creates a swirling cloud of lead mist comprising molten lead droplets above the molten lead. Oxidizing gases, such as air, are injected into this cloud of lead droplets resulting in extensive oxidation of the lead therein. The lead oxide is collected as the process proceeds.

In the control of this oxidation process, it is important to maintain specific limits wherein it is highly desirable to preferably maintain the metallic free lead in the Barton litharge at about 27%. Since such an exact control is too difficult and expensive, it has been found that a range of from 24% to 30% free lead is within useful production limits. The remainder of the litharge may be a mixture of yellow and red litharge wherein normally the percentages thereof are maintained about equal. For example, a typical Barton litharge will include free lead in the quantities noted above together with a substantial equal mixture of yellow and red litharge making up the remainder.

It has been found, however, when utilizing standard procedures, the metallic lead content will vary widely whereby the final product yields variable results or must be additionally processed to maintain a uniform material. Furthermore, the product is not uniform at either the high or low end of the range but varies constantly during the oxidation process. Samples taken from the Barton pot at timed intervals during normal operation show this spread and also show that the distribution of variation in lead content is such that a significant portion of the material being processed falls outside the 24% to 30% preferred range. For example, control figures taken over a substantial period of time using production lead in the pot show 36% of the samples are below the 24% minimum for free lead and 1.95% are above the 30% maximum leaving the remainder within the preferred range. Furthermore, the spread is large ranging from 15.1% free lead to 34.7% free lead or a spread of 19.6%.

The Barton litharge, after manufacture, may be further processed, for example, by the method set forth in Seabury and Daily Patent 2,347,171 to further convert the materials. It is obvious that, if this additional processing is carried out, it is highly desirable to maintain the metallic lead content in the Barton litharge within close limits so that the additional processing procedures are stabilized and are carried out economically.

Lead used in the manufacture of Barton litharge is normally of a type which includes very low percentages of impurities, such as bismuth, copper, arsenic antimony, tin, zinc, iron and silver. These are generally maintained within trace limits whenever lead makes up about 99.94% according to specification.

We have discovered that the percent conversion of metallic lead to lead oxide in the Barton pot process can be materially improved and stabilized by the addition of controlled quantities of antimony to the lead. In this connection it appears that antimony has a decided bearing on the conversion of lead to lead oxide. Variations in the impurity ratio, therefore, have a marked effect on the efficiency and stability of the process. We have discovered specifically that, when antimony is present between the quantities of .0015% minimum and .0040% maximum by weight with .0025% being preferred, that the conversion of lead to lead oxide is materially improved and that the entire process is greatly stabilized. Furthermore, we have found that the variations above and below the desired control limits for metallic lead are reduced whereby the variations in the materials coming from the Barton pot are stabilized and more constant in analysis. We have no theory as to why the addition of this small quantity of antimony yields such improved results but we have demonstrated that controls are greatly simplified when the lead used in the Barton pot contains this small controlled percentage of antimony.

For example, an entire series of similar sampling procedures were carried out as heretofore mentioned with the following results, all conditions being the same except that antimony was included in the lead in quantities of from .0015% to .0040% by weight. In this series of tests only .8% of the samples were below the 24% minimum and only 1.4% were above the 30% maximum. Furthermore, the spread was only 7.7% ranging from 23.30% to 31%. It is apparent that this constitutes a great improvement resulting in greater uniformity of product. The improvement was obtained without changing any controls and by merely including the antimony addition in the lead.

Another advantage of the antimony addition appears to be in reducing maintenance required on the Barton pots by improving ease of clean-up. It is quite apparent that metallic lead is not as easy to remove as is an oxide and, when the metallic lead is maintained within predetermined ranges, the maintenance of the pots is greatly facilitated.

The specification for lead used in our improved process is as follows:

*Production Run Lead Analysis*

| | |
|---|---|
| Silver | 0.0015% max. |
| Copper | 0.0015% max. |
| Arsenic | 0.0015% max. |
| Antimony | 0.0015–.0040%. |
| Antimony and tin combined | 0.0095% max. |
| Zinc | 0.0015% max. |
| Iron | 0.002% max. |
| Bismuth | 0.05% max. |
| Lead by difference | 99.94% min. |

Test run on alloys including controlled small quantities of bismuth, tin, copper and/or silver did not exhibit the improvements that accrue from using antimony.

The lead analysis need not be changed except for the addition of the antimony to within the limits desired which yields the improvement described herein. Furthermore, no change in processing need be made. We have also found that, if these minimum quantities of impurities with the exception of antimony are completely removed, no change in the operation is noted since the antimony alone appears to stabilize fully the oxidation process.

While the embodiments of the present invention as herein disclosed constitute preferred forms, it is to be understood that other forms might be adopted.

What is claimed is as follows:

1. In a process of making Barton litharge which consists essentially of metallic lead with the remainder being substantially equal mixtures of yellow and red litharge, the steps comprising: creating a mist of molten lead particles from substantially pure molten lead including antimony within the range of .0015% to .0040% by weight, subjecting said mist to the action of an oxidizing gas for bringing the metallic lead content into a range of from 24% to 30% by weight of the whole, and then collecting and cooling the oxidized lead particles together with the lead particles.

2. In the control of the manufacture of Barton litharge which consists essentially of metallic lead with the remainder being a substantially equal mixture of yellow and red litharge, that step in the process of adding antimony to substantially pure lead prior to the oxidation thereof wherein the antimony is added in the range of .0015% to .0040% by weight for the sole purpose of stabilizing the oxidation of the lead whereby a mixture of yellow and red lead oxides in substantially equal proportions and in the range of 70–76% by weight is produced with the remainder being substantially pure metallic lead.

3. In the control of the manufacture of Barton litharge which consists essentially of metallic lead with the remainder being a substantially equal mixture of yellow and red litharge, that step in the process of adding antimony to the substantially pure lead prior to oxidation thereof wherein the antimony is added in quantities of about .0025% by weight of the lead for the sole purpose of stabilizing the oxidation of the lead whereby a mixture of yellow and red lead oxides in substantially equal proportions and in the range of from 70–76% by weight is produced with the remainder being substantially pure metallic lead.

References Cited in the file of this patent

UNITED STATES PATENTS

| | | |
|---|---|---|
| 2,383,220 | Seabury et al. | Aug. 21, 1945 |
| 2,728,808 | Koerner | Dec. 27, 1955 |
| 2,900,431 | Orsino | Aug. 18, 1959 |